April 5, 1938.  G. NONHEBEL ET AL  2,113,198
WET PURIFICATION OF GASES
Filed Feb. 4, 1935  2 Sheets-Sheet 2
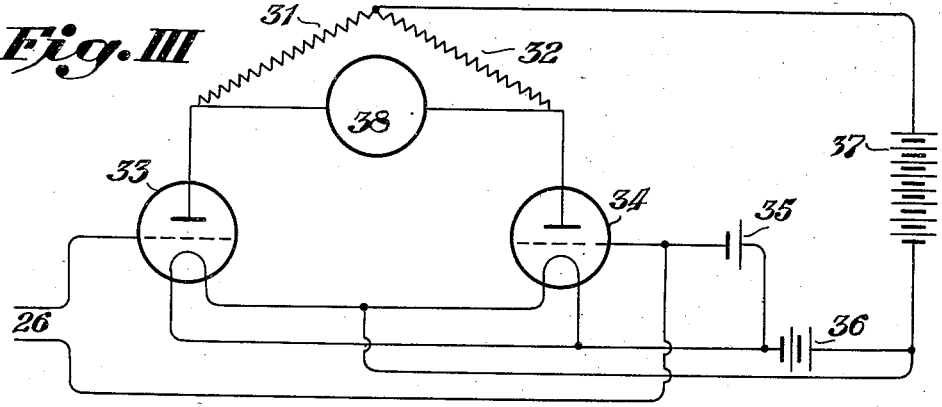
Fig. III
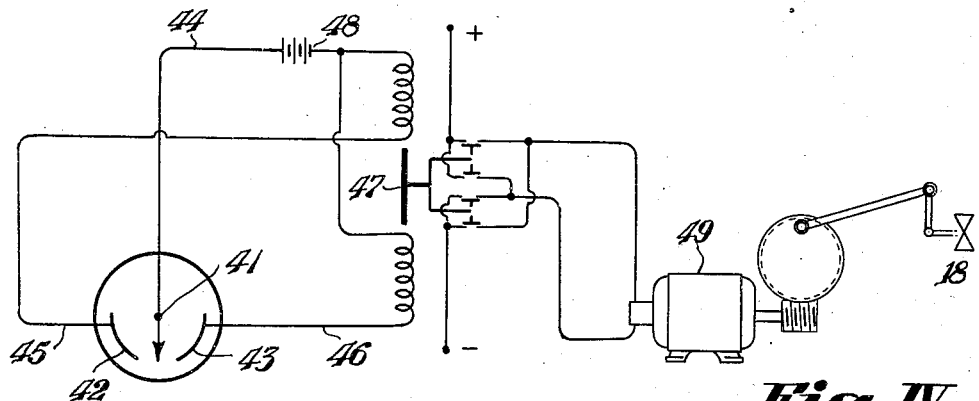
Fig. IV
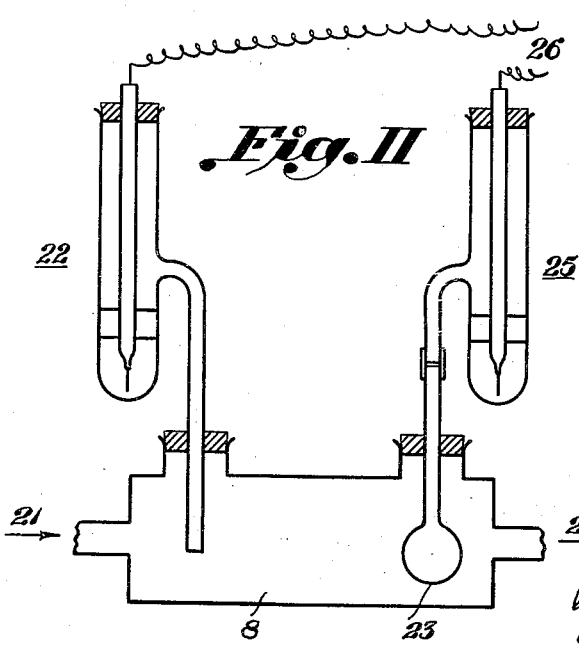
Fig. II
Inventors
Gordon Nonhebel
John Lindon Pearson
by Roy F. Steward
their Atty Patented Apr. 5, 1938

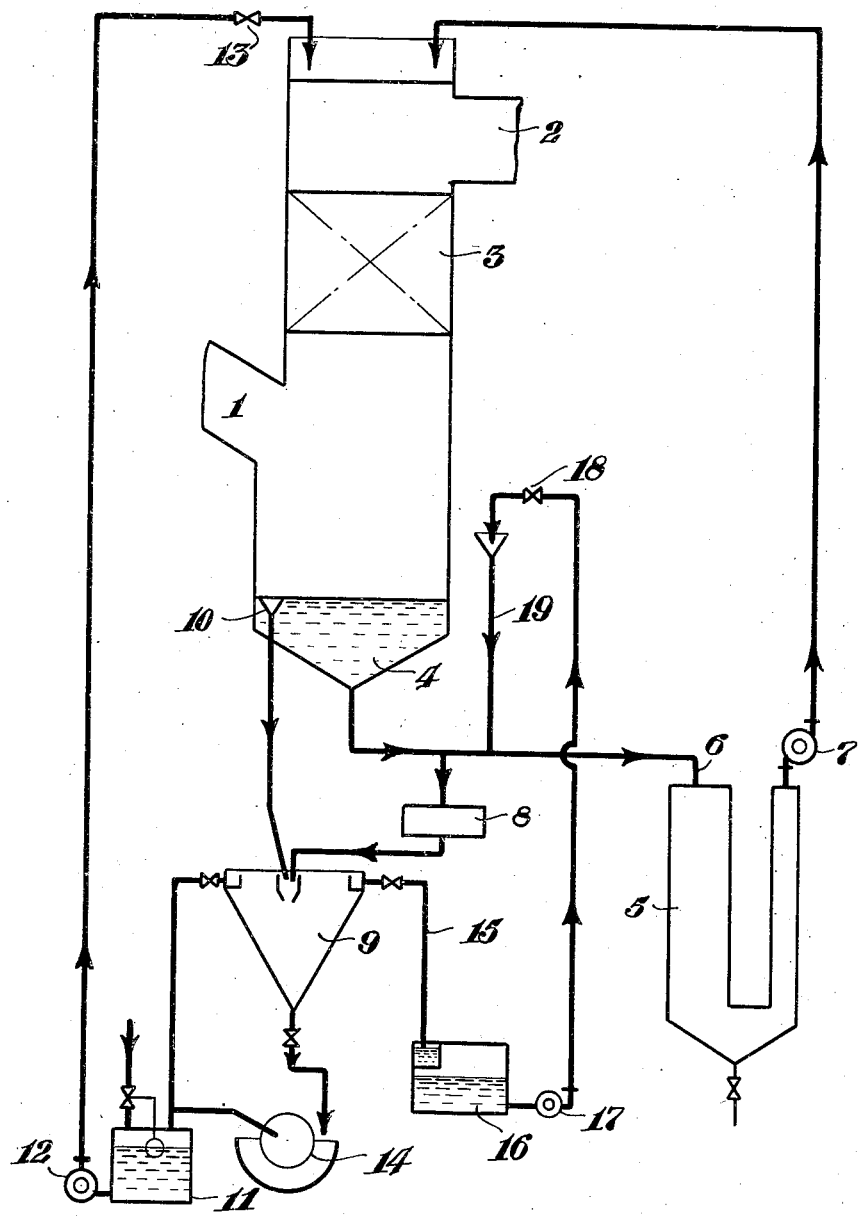
Fig. I

2,113,198

UNITED STATES PATENT OFFICE 2,113,198

WET PURIFICATION OF GASES

Gordon Nonhebel and John Lindon Pearson, Norton-on-Tees, England, assignors to Imperial Chemical Industries Limited, a corporation of Great Britain Application February 4, 1935, Serial No. 4,891
In Great Britain February 5, 1934

4 Claims. (Cl. 23—2)

This invention relates to the wet purification of gases, and in particular to the removal of sulphur oxides and other strongly acid gases such as hydrochloric acid from flue gases and the like by passing the gases to be purified through a scrubber in contact with water containing calcium bicarbonate and a little calcium carbonate in suspension, the liquor leaving the scrubber being replenished by the addition of lime or chalk (hereinafter referred to as alkali) before recirculation in whole or in part through the scrubber. Owing to the process of recirculation, the liquor becomes saturated with and may contain suspended solid calcium sulphite and calcium sulphate.

In such processes it is necessary to regenerate the liquor as far as possible by removing the precipitates of calcium sulphite and sulphate which are formed, and for this purpose a portion of the circulating liquor is led away either to drain or to a settler or filter or other device adapted to remove solid matter. In the latter case the clarified liquor may then be returned to the circulating system. Fresh water is, of course, added to replace losses.

In the following description of our process, all pH values of solutions mean the pH values of such solutions as determined by allowing a small portion of the solutions to settle rapidly and determining its pH value colorimetrically with indicators by means of apparatus called capillators, marketed by British Drug Houses Ltd. Where reference is made to a pH instrument or recorder, this instrument has been set or standardized on plant liquors by capillator tests as above. The temperature of the circulating liquor in the scrubber is usually in the range 40° C. to 60° C. During the process of settling and mixing with the coloured indicator for the above mentioned tests the test portion of the solution becomes cooled to about 20° to 30° C. and the pH values above referred to are at temperatures within this range.

For reasons of economy the amount of lime or chalk used should not greatly exceed the theoretical amount required to fix the sulphur oxides absorbed by the liquor, while the liquor in the scrubber should not be allowed to become strongly acid (pH 5 or under) owing to the corrosion which would then tend to take place and owing to the diminished absorption efficiency of the liquor for the sulphur oxides. It will be evident from the nature of the gases under treatment, that any lime or hydrated lime added to the liquor as neutralizing agents for the absorbed sulphur oxides will immediately form calcium carbonate and bicarbonate and the former will be precipitated from solution. Any solid calcium carbonate in the scrubber exit liquor will be partially lost in the extraction from the system of the solid matter referred to above during the process of regeneration.

If excess of lime is added to the scrubber exit liquor, the whole of the carbon dioxide dissolved in the liquor from the flue gases may be absorbed in the formation of calcium carbonate and consequently the amount of calcium bicarbonate may be reduced even to zero. Since dissolved calcium bicarbonate is the principal active agent in the absorption of the sulphur oxides, any reduction in its concentration will reduce the absorptive powers of the liquor, except insofar as fresh calcium bicarbonate is formed when the liquor again comes into contact with the flue gas.

If a still larger excess of lime is added to the scrubber exit liquor, so that its pH value is raised above about 10 when the liquor enters the scrubber, free calcium hydroxide will be present in solution and this will react with the carbon dioxide in the flue gas forming a precipitate of calcium carbonate which will form a scale on the scrubbing surfaces.

By experiment we have found that the proportion of calcium carbonate in the mixed solids of ash, calcium sulphite and sulphate rejected from the system can be kept below 5% by close control of lime addition so that the pH of the scrubber exit liquor is maintained within the limits 6.0 to 6.4 (or by close control of chalk addition so that the pH of the scrubber effluent is maintained within the limits 6.0 to 6.3). If this control is maintained, the alkali addition does not exceed 10% excess of the theoretical required by the sulphur oxides absorbed by the liquor in the scrubber, and in the case of treatment of flue gases containing appreciable amounts of alkaline dust, such as gases from boilers fired with powdered fuel or gases from cement kilns, the alkali to be added may be substantially below theoretical. We have found that it is desirable to operate the process with a slight excess of calcium carbonate in suspension in the liquor as this excess prevents formation of substantial acidity in the event of a sudden increase in the acidity of the flue gas under treatment.

It is also a property of calcium sulphite that its solubility in water is materially increased with reduction in the pH value of the solution, and this increase for a given change in pH value is greater the lower the pH range. During the passage of the liquor through the scrubber, the pH of the solution falls. For example in a particular type of scrubber with which we have made experiments, the change in pH on full load is:—

From 6.8 at the entrance to 6.2 at the exit, with lime neutralization; and from 6.5 at the entrance to 6.1 at the exit, with neutralization by a reactive finely divided chalk, such as industrial precipitated by-product chalk.

In order therefore to obtain complete freedom from scaling by calcium sulphite in the scrubber, we arrange the gas and liquor rates so that the amount of calcium sulphite formed during each passage of the liquor through the scrubber is not greater than the sum of (1) The increase in solubility of calcium sulphite in the liquor during its passage through the scrubber, due to the change in pH. We have found that this increase is about 1.5 milligram equivalents of calcium sulphite per litre for a pH change from 6.8 to 6.2 in scrubber liquors, and (2) The maximum permissible amount of supersaturation of the liquor by calcium sulphite that is tolerated by the material of the scrubber packing without the growth of scale. This amount of supersaturation is about 4 milligram equivalents of calcium sulphite per litre of scrubber liquor.

It follows from the considerations described in this specification that the maximum capacity of the scrubber without scaling and without waste of alkali is obtained by proportioning the alkali addition to the scrubber exit liquor so that the latter is maintained as closely as possible at pH 6.2 for lime addition or 6.1 for chalk addition.

In practice we find it necessary to allow for increases or decreases of 0.1 pH or 0.2 pH depending on whether chalk or lime respectively is employed as alkali.

The object of the present invention is to provide a simple and convenient method of regulating the addition of the alkali in a process of the kind described in order to obtain maximum economy of alkali, freedom from scaling of the scrubber packing by calcium carbonate or calcium sulphite, maximum capacity of the scrubber, maximum capacity of the solids removal plant (namely, settlers or filters or the like) and freedom from corrosion.

According to our invention, we determine the pH of the scrubber exit liquor continuously and at very frequent intervals, and we regulate the addition of the lime or chalk so that this pH is within the limits: 6.0 to 6.4 and preferably at 6.2 with lime neutralization or 6.0 to 6.3 and preferably at 6.1 with chalk neutralization. Preferably we use a continuous pH recorder for controlling the addition of alkali so that the scrubber exit liquor has a substantially constant pH within the specified range.

The lime or chalk should be added continuously, and is most conveniently added in the form of a slurry. The valve controlling the flow of the alkali may be manually operated or connected through known regulating mechanism to the pH recorder so that automatic control is obtained. The lime or chalk may be added to the liquor before or after the point at which a portion of the liquor is withdrawn for removal of solid matter, or it may be added to the clarified liquor which is returned to the system, or to the make-up water.

When determining the pH of the solution manually and at frequent intervals we employ the usual coloured indicators such as the capillators already mentioned, but preferably we determine the pH of the solution continuously by passing a portion of the liquor through the cell of a hydrogen ion measuring arrangement, for example through a liquor cell containing a calomel electrode and a glass electrode dipping into the scrubber exit liquor with a second calomel electrode making contact with liquor of constant known pH contained inside the glass electrode. The pH is then measured by measuring the electromotive force between the two calomel electrodes by means of a thermionic potentiometer. In one form of this instrument, adjustment can be made to the potentiometer so that no current is flowing when the pH of the scrubber exit liquor is at the required value. Then under out-of-balance conditions current will flow one way or the other, and this can be registered on a continuously recording milliammeter and may also be made to operate relays which in turn will open or close the alkali supply valve as required.

A suitable arrangement for this purpose is illustrated in the accompanying drawings, in which Figure I is a diagrammatic flowsheet of a flue gas washing plant, Figure II is a diagrammatic arrangement of a cell for the continuous measurement of hydrogen ion values of the liquor, Figure III is a wiring diagram of a suitable thermionic potentiometer, and Figure IV is a diagrammatic arrangement of the automatic control for the alkali supply valve.

Referring to Figure I, the flue gas enters the scrubber 3 at 1 and leaves at 2. The liquor leaving the scrubber well 4 is introduced at 6 into a U-shaped tank 5, the object of which is to provide such a capacity in the liquor recirculating system that sufficient time, e. g. 2–3 minutes, is allowed for crystallization of calcium sulphite and sulphate formed in the system. After leaving the tank 5 the liquor is recirculated to the scrubber by the pump 7. In order to control the pH automatically, a small sample is bled off continuously to the liquor cell 8 of a pH recorder. The liquor after passage through the liquor sampling cell can either be rejected to drain or returned to the circulating system, for example by passage to the settler 9.

In order to remove accumulated solid matter a portion of the liquor leaving the scrubber is purged off at 10 and is passed to the settler 9. A part of the clarified liquor from this settler is passed to the tank 11, from which liquor is continuously extracted by pump 12 and returned to the scrubber via valve 13. The thick liquor from the settler 9 is dewatered on a rotary filter 14 and the filtrate is added to the tank 11.

The other part of the clarified liquor from the settler 9 is passed by the line 15 to a lime or chalk slurry preparation tank 16. The slurry is withdrawn by a pump 17 and passed via a valve 18 and line 19 into the circulating stream of liquor. The valve 18 is controlled by the mechanism illustrated in Figure IV in accordance with the pH of the liquor leaving the scrubber well 4 via cell 8.

Figure II illustrates one method of sampling the liquor continuously. The liquor enters the cell 8 through a pipe 21, flows past measuring electrodes 22 and 23 and passes out at 24. 22 is a saturated calomel electrode dipping into the sample of liquor. 23 is a glass electrode also dipping into the scrubber liquor. The bulb of the glass electrode 23 is filled with a buffer solution of known pH, making contact with a second similar calomel electrode 25. The electromotive force of this arrangement is given by the equation E total=E glass+0.0001984 T (pH 1–pH 2) where E glass is the asymmetric potential of the glass electrode. T is the absolute temperature in degrees centigrade; pH 1 and pH 2 are the pH values of the scrubber liquor and the buffer solution respectively. This electromotive force is measured by taking wires 26 to the terminals of a thermionic potentiometer of the type illustrated in Figure III.

A simple form of circuit for a thermionic potentiometer is shewn in Figure III, which comprises a Wheatstone bridge containing fixed resistances 31 and 32 and two thermionic tubes 33 and 34 36 is the filament battery, 35 the grid bias and 37 the plate battery. The unknown potential from the liquor cell in Figure II is led to the terminals 26 where it is superimposed on the grid bias 35. The instrument 38 measures the out-of-balance current from the Wheatstone bride. This instrument may be a recording milliammeter, to which is attached a relay for the automatic control of the alkali valve operating motor. A simple form of such relay is shewn in Figure IV.

Referring now to Figure IV, 41 is a metal needle swinging between two metal segments 42 and 43, set a short distance apart on either side of the zero of the instrument. Thus, supposing it is desired to maintain the pH between the limits 6.0 to 6.3, the galvanometer needle is set to read zero when the pH is at 6.15, and the segments 42 and 43 are placed at the positions corresponding to deflections of the needle to pH 6.0 and pH 6.3 respectively. When the pH rises or falls to the limits 6.0 and 6.3, connections are made through the wires 44 and 45 or 44 and 46, which operate the relay R up or down by virtue of the power supplied by the battery 48. According to whether the relay is moved up or down, current is passed to the motor 49 operating the lime supply valve 18, so that it either opens or closes.

It will be understood that, in order to be suitable for use in practicing the invention, the electrodes employed in determining the pH of the scrubber exit liquor should be of such type that they are without effect upon the pH of the liquor under test. Of such type are the electrodes specifically referred to in the foregoing description. On the other hand, a hydrogen electrode is unsuitable, in that the necessary stream of hydrogen removes carbon dioxide from the liquor and hence alters its pH. A quinhydrone electrode is also unsuitable on account of its reaction with the sulphur dioxide contained in the liquor.

Having now particularly described and ascertained the nature of our said invention and in what manner the same is to be performed, we declare that what we claim is:—

1. In a process of flue gas washing with the aid of a recirculated liquor to which a slurry of lime is continuously added in amount approximately equivalent to the sulphur oxides and other acid gases absorbed from the flue gas, the steps of continuously determining the pH of the scrubber exit liquor by measuring the E. M. F. between an electrode sensitive to changes in pH and a standard reference electrode, both of said electrodes being immersed in said liquor and being without effect on the pH thereof, and regulating the addition of said slurry so as to keep said pH within the limits 6.0–6.4.

2. In a process of flue gas washing with the aid of a recirculated liquor to which a slurry of lime is continuously added in amount approximately equivalent to the sulphur oxides and other acid gases absorbed from the flue gas, the steps of passing a portion of the scrubber exit liquor through a cell containing a glass electrode and a limb of a calomel electrode, measuring the E. M. F. between said electrodes, and regulating the addition of said slurry so as to keep said E. M. F. within limits corresponding to a pH of said exit liquor of 6.0–6.4.

3. In a process of flue gas washing with the aid of a recirculated liquor to which a slurry of chalk is continuously added in amount approximately equivalent to the sulphur oxides and other acid gases absorbed from the flue gas, the steps of continuously determining the pH of the scrubber exit liquor by measuring the E. M. F. between an electrode sensitive to changes in pH and a standard reference electrode, both of said electrodes being immersed in said liquor and being without effect on the pH thereof, and regulating the addition of said slurry so as to keep said pH within the limits 6.0–6.3.

4. In a process of flue gas washing with the aid of a recirculated liquor to which a slurry of chalk is continuously added in amount approximately equivalent to the sulphur oxides and other acid gases absorbed from the flue gas, the steps of passing a portion of the scrubber exit liquor through a cell containing a glass electrode and a limb of a calomel electrode, measuring the E. M. F. between said electrodes, and regulating the addition of said slurry so as to keep said E. M. F. within limits corresponding to a pH of said exit liquor of 6.0–6.3.

GORDON NONHEBEL.
JOHN LINDON PEARSON.